June 11, 1968 W. L. KIBLER 3,388,288
VEHICLE LIGHT CONTROL SYSTEM TO DEENERGIZE THE LIGHT CIRCUIT
A PREDETERMINED TIME AFTER THE IGNITION IS DEENERGIZED
Filed April 13, 1966 2 Sheets-Sheet 1

INVENTOR.
WILLIS L. KIBLER
BY
ATTORNEY.

June 11, 1968 W. L. KIBLER 3,388,288
VEHICLE LIGHT CONTROL SYSTEM TO DEENERGIZE THE LIGHT CIRCUIT
A PREDETERMINED TIME AFTER THE IGNITION IS DEENERGIZED
Filed April 13, 1966 2 Sheets-Sheet 2

INVENTOR.
WILLIS L. KIBLER
BY
Rudolph L. Lowell
ATTORNEY.

United States Patent Office 3,388,288
Patented June 11, 1968

3,388,288
VEHICLE LIGHT CONTROL SYSTEM TO DEENERGIZE THE LIGHT CIRCUIT A PREDETERMINED TIME AFTER THE IGNITION IS DEENERGIZED
Willis L. Kibler, Detroit, Mich., assignor to The Delman Company, Cookeville, Tenn., a corporation of Tennessee
Filed Apr. 13, 1966, Ser. No. 542,257
4 Claims. (Cl. 315—77)

ABSTRACT OF THE DISCLOSURE

The control system provides for the manual control of a vehicle light circuit in a usual manner when the vehicle engine is in operation. When the engine ignition system is opened the light circuit is automatically turned off following a predetermined time period after the ignition switch has been opened. The light circuit is energized by the manual closing of a normally open relay switch that is electrically maintained closed by a relay coil in a holding circuit, and which relay coil is energized in response to the manual closing of the relay switch. A time delay circuit includes a relay that has a normally closed relay switch connected with the holding circuit. A transistor in the time delay circuit is operable in response to an opening of the engine ignition switch to energize the relay coil in the time delay circuit whereby to open the normally closed relay switch of the time delay circuit. As a result the holding circuit is de-energized and the manual relay switch is released to its normally open position to open the light circuit.

This invention relates generally to a control system for electrical apparatus of automobiles or similar vehicles and in particular to a control system for automatically turning off the lighting system of an automobile when the ignition switch is turned off.

An object of this invention is to provide an improved control system for the lighting system of a vehicle.

Another object of this invention is to provide a vehicle light control system wherein the lights are automatically turned off in a predetermined time period following either the opening of the engine ignition switch or the operating of the light system when the engine is at rest.

A further object of this invention is to provide a vehicle light control system in which the lights are manually controlled as desired when the vehicle engine is in operation and, when the engine is at rest or the ignition switch is turned off, being automatically de-energized following a predetermined time period of operation commencing with the time operation of the control system is manually initiated or with the time the ignition switch is turned off.

Yet another object of this invention is to provide a vehicle light control system wherein a light circuit is manually closed and then electrically maintained closed by a holding circuit which is connected with a time delay circuit operable in response to a turning off of the vehicle engine ignition system to automatically delay the opening of the holding circuit for a predetermined time period following the time the ignition switch is turned off.

Still a further object of this invention is to provide a vehicle light control system for automatically turning off the lights, when the vehicle engine ignition system is opened, which is economical in cost, efficient in operation, easy to install and operable over a prolonged service life with a minimum of attention.

Figure 1:
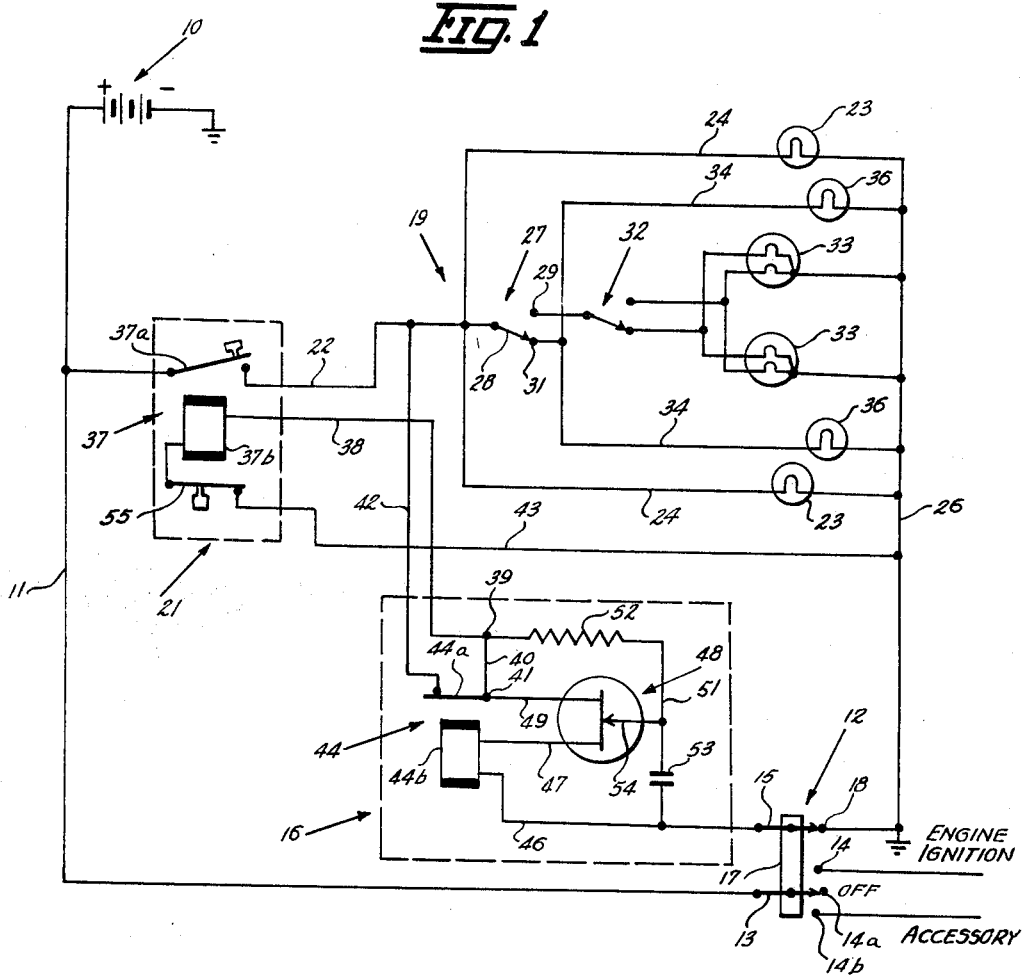
Figure 2:
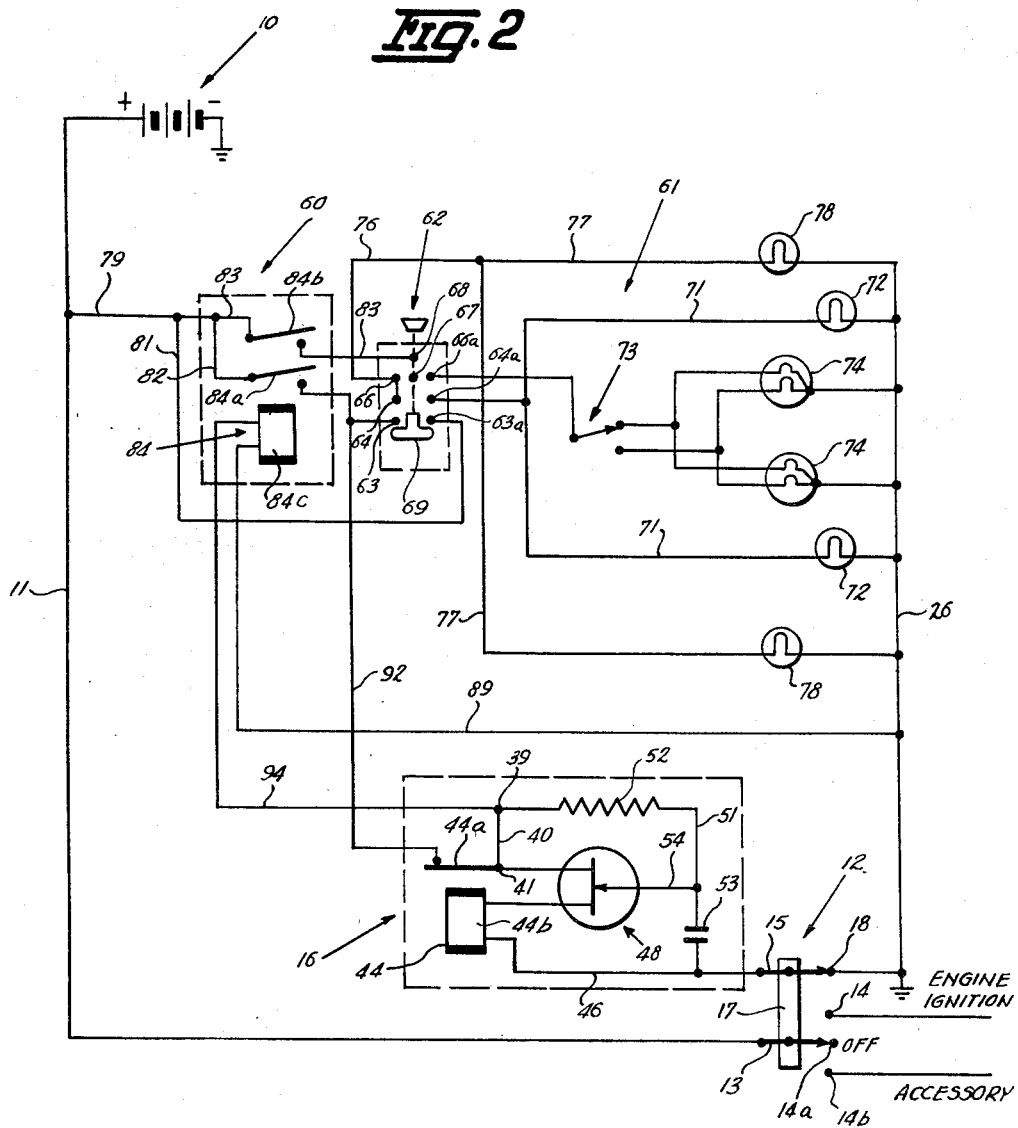

Further objects, features and advantages of this invention will become apparent from the following description when taken in connection with the accompanying drawing in which:

FIG. 1 is a schematic illustration of one form of the vehicle light control system of this invention in which a hold-in relay circuit is manually closed and electrically opened in response to an open condition of the vehicle ignition system and with a light switch in the light circuit being manually operable to selectively control the operation of the lights in the circiut; and FIG. 2 is a modified form of the invention in which a hold-in circuit is electrically closed by actuation of a manually operable selector light switch in the light circuit and electrically opened in response to an open condition of the vehicle ignition system.

With reference to FIG. 1 there is shown a battery 10 one pole of which is connected through a lead 11 to one side of a manually operable vehicle ignition switch unit 12. As illustrated the switch unit 12 has a first switch arm 13 movable to a first position in contact engagement with a terminal 14 to close the engine ignition system, to a second or off position indicated at 14a to open the engine ignition system and to a third position in contact engagement with a terminal 14b to close the vehicle accessory systems. A second switch arm 15 is connected through a loosely pivoted link 17 with the first switch arm 13 so as to be movable in response to movement of the switch arm 13. As shown, when the switch arm 13 is in contact engagement with either of the terminals 14 or 14b, the switch arm 15 is open. On movement of the switch arm 13 to its off position, the switch arm 15 is moved into contact engagement with a terminal 18 to close a time delay circuit forming part of the control system of this invention and shown generally at 16. Since the ignition and accessory systems do not form a part of the invention their further description is not necessary.

The vehicle light control system of this invention comprises generally a light circuit indicated at 19, a holding circuit 21 and the time delay circuit 16 for opening the holding circuit in response to the movement of the ignition switch arm 13 to its off position.

The light circuit 19 includes a line 22 connected to the lead line 11 for supplying current directly to tail lights 23 through corresponding branch lines 24 with the tail lights 23 being connected to a ground line 26 to complete the circuit therefor. The supply line 22 terminates in a manually operable two-way selector switch 27 which includes a switch arm 28 selectively movable into contact engagement with terminals 29 and 31. The terminal 29 is connected to a usual dimmer switch 32 for headlights 33 which are connected to the ground line 26. The terminal 31 is connected to branch lines 34 for corresponding parking lights 36 that are connected to the ground line 26.

Thus with current supplied to the selector switch 27 the tail lights 23 are energized independently of the switch 27 and with the switch 27 being operable to provide for operation of either the headlights 33 or parking lights 36 with the tail lights 23.

Operation of the headlight circuit 19 is controlled by a normally open relay switch 37a connected in the supply line 22 and forming part of a relay 37 having the coil or winding 37b thereof connected in the holding circuit 21. One side of the relay winding 37b has a line 38 connected to a terminal 39 having a line 40 connected to a terminal 41 which is connected through a line 42 to the supply line 22 at a position between the relay switch 37a and the tail light branch lines 24. The other side of the relay winding 37b is connected to the ground 26 through a line 43. Connected in the line 42 is a normally closed relay switch 44a that forms part of a relay 44 having a winding 44b connected in the time delay circuit 16.

The normally open relay switch 37a is manually operable to a closed position to close the supply line 22 for feeding current to the light circuit 19. Closing of the relay switch 37a additionally provides for the closing of the holding circuit 21 to energize the coil 37b. It is seen therefore that the relay switch 37a is manually closed and then electrically maintained in its manually closed position by the relay coil 37b on closing of the holding circuit 21, which from the lead line 11 is closed through the supply line 22 and closed relay switch 37a, line 38 and normally closed relay switch 44a, coil 37b and line 43 to the ground line 26.

As thus far described the light circuit 19 and holding circuit 21 are closed whereby to provide for a manual control of the lights 33 and 36 in the light circuit in response to a manual operation of the selector switch 27. This condition will continue for so long as the holding circuit 21 remains closed.

The time delay circuit 16 on being closed in response to the off or open position 14a of the ignition switch arm 13 functions to open the holding circuit 21 after a predetermined time period commencing with the time of opening of the engine ignition system. On opening of the holding circuit 21 to de-energize the relay winding 37b the relay switch 37a is released to its normally open position shown in FIG. 1. The light circuit 19 and the holding circuit 21 are thus rendered inoperative or in a normal rest condition whereby to shut off the lights in the light circuit 19.

In the time delay circuit 16 one side of the relay coil 44b is connected by a line 46 to the switch arm 15, the associated terminal 18 of which is connected to the ground line 26. The other side of the relay coil 44b is connected to the emitter electrode 47 of a unijunction semiconductor or transistor 48 having a collector electrode 49 connected to the terminal 41, which through line 40 and terminal 39 is connected by a shunt line 51 to the line 46 at a position between the relay winding 44b and the switch arm 15. The shunt line 51 carries in series connection a resistor 52 and a capacitor 53 with the resistor being adjacent to the terminal 39. A base electrode 54 for the transistor 48 is connected to the shunt line 51 between the resistor 52 and the capacitor 53.

When the switch arm 13 of the ignition switch unit 12 is in contact with either the ignition system or accessory system terminals 14 or 14b, respectively, there is no current flow through the shunt line 51. In moving the ignition switch arm 13 to its off position 14a the shunt line 51 is connected through the switch arm 15 to the ground line 26 to complete a circuit from the supply line 22 through line 42, relay switch 44a, line 40, shunt line 51, line 46 and switch arm 15 to ground.

A charging current is thus permitted to flow through the resistor 52 to the capacitor 53 to produce a predetermined voltage build-up in the capacitor. When this predetermined voltage is reached the transistor 48 is fired or actuated to energize the relay 44. On being energized the relay coil 44b opens the normally closed relay switch 44a in the holding circuit 21 whereby the holding circuit 21 is opened. As a result the relay winding 37b is de-energized and the relay switch 37a in the light circuit 19 is released to its normally open position shown in FIG. 1. The light circuit 19 is thus operated to shut off whatever lights thereof were previously turned on. It is apparent, of course, that with the switch 37a released to its open position the current supplied to the shunt line 51 is cut off. The control system is thus in a rest or non-operating condition until the relay switch 37a is again manually closed.

Thus in response to either a turning off of the engine ignition switch unit 12 or in response to a closing of the relay switch 37b, when the ignition switch arm 13 is in its off position, lights in the light circuit 19 will automatically be shut off for a delayed time period commencing with the time of opening of the engine ignition system or with the time of closing of the relay switch 37a if the ignition system is already open or turned off.

To provide for an opening of the light circuit 19 independently of the opening action of the time delay circuit 16 a normally closed push button switch 55 is connected in the ground line 26. With the push button switch 55 opened temporarily the holding circuit 21 is opened to de-energize the relay 37 to release or open the relay switch 37a. To provide for a continuous operation of the light circuit 19 when the engine ignition system is turned off, the switch arm 13 of the ignition switch unit 12 is moved into engagement with terminal 14b to close the accessory system.

In one embodiment of the invention the resistor 52 has a resistance of 470,000 ohms for a power input of one-half watt and the capacitor 53 a capacitance of 100 microfarads at 25 volts. Actuation of the transistor 48 takes place when the voltage value in the caapcitor 53 builds up to about 10 volts. In this embodiment of the invention there is obtained a time delay of about ninety seconds in the opening of the holding circuit 21 following the time of opening of the ignition system by the ignition switch unit 12. The resistance of the resistor 52 is given a value to predetermine the 10 volt build-up in the capacitor 53 to set the operating point or time of the transistor 48.

The modified form of the control system shown in FIG. 2 is similar to the control system of FIG. 1 except for the holding circuit thereof being electrically closed in response to the actuation of a light selector switch. Numerals of reference, therefore, relative to the description of FIG. 1 will be used to designate like parts in the control system of FIG. 2.

The system of FIG. 2 has the ignition switch unit 12 connected to the battery 10 through the lead line 11 and includes a holding circuit 60, a light circuit 61 and the time delay circuit 16. The light circuit 61 has a manually operated switch unit 62 which includes oppositely arranged pairs of terminals 63 and 63a, 64 and 64a and 66 and 66a with the terminals 63, 64 and 66 and 63a, 64a and 66a being arranged in parallel spaced rows. For convenience the terminals 63 and 63a will be referred to as starting terminals, the terminal 64a, a parking light terminal, the terminals 64 and 66 tail light terminals and the terminal 66a a headlight terminal. Intermediate the terminals 66 and 66a is a terminal 67 that is connected to a terminal 68 located outwardly from the terminals 66 and 66a. These terminals 67 and 68 will be referred to as tail light terminals. All of the terminals in the switch unit 62 are selectively connected by a manually operable bridge connector 69 of a generally inverted T-shape in plan view.

The parking light terminal 64a is connected to a pair of branch lines 71 for corresponding parking lights 72 which are connected to the ground line 26. The headlight terminal 66a is connected to a usual dimmer switch 73 for headlights 74 which are connected to the ground line 26. The tail light terminals 64 and 66 are connected together, with the terminal 66 having a line 76 connected to a pair of branch lines 77 for tail lights 78 that are connected to the ground line 26.

A supply line 79 for the light circuit 61 is connected to the lead line 11 and has three branch lines 81, 82 and 83. The branch line 81 is connected to the starting terminal 63a of the light switch unit 62. The branch line 82 is connected to the starting terminal 63 and has a relay switch 84a connected therein. The branch line 83 carries a relay switch 84b with the relay switches 84a and 84b forming part of a double switch relay 84 having a single coil 84c in the holding circuit 60. One side of the coil 84c is connected by a line 89 to the ground line 26. The other side of the coil 84c has a line 91 connected to the terminal 39 in the time delay circuit 16. This terminal 39 is connected through the line 40 and the relay switch 44a to a line 92 which connects with the branch line 82 at a position between the relay switch 84a and the starting terminal 63 of the switch unit 62. As previously described in connection with FIG. 1 the relay switch 44a forms part of the relay 44 that has a winding 44b in the time delay circuit 16.

As shown in FIG. 2 the control system is in its rest or open position. To operate the lights in the light circuit 61 when the ignition system is turned on by the switch arm 13 at the ignition switch unit 12 the bridge connector 69 is manually moved from its off position, shown in FIG. 2, to connect the starting terminals 63 and 63a. It will be understood that the connecting together of the starting terminals may be only a temporary connection made during a continuous movement of the bridge connector 69 from its off position to light operating positions connecting either the terminals 64 and 64a or 66 and 66a.

When the bridge connector 69 is moved across the starting terminals 63 and 63a the holding circuit 60 from the supply line 79 is closed through branch line 81, the starting terminals 63 and 63a and the bridge connector 69, line 92, relay switch 44a, lines 40 and 91 to the relay winding 84c and from the winding 84c through line 89 to the ground line 26. On energization of the holding circuit relay 84 the relay switches 84a and 84b are simultaneously electrically closed and with the closing of the relay switch 84a acting to electrically maintain the holding circuit 60 closed independently of the switch unit 62.

The closing of the relay switch 84b connects the supply line 79 to the tail light terminals 67 and 68. Thus on manual movement of the bridge connector 69 from the starting terminals 63 and 63a and into contact engagement with the terminals 64, 64a and 67, the parking lights 72 and tail lights 78 are operated. The current flow to the parking lights 72 from the branch line 83 is through the tail light terminals 67 and 68, bridge connector 69, parking light terminals 64a and the branch lines 71. The circuit for the tail lights 78 from the terminals 67 and 68 is completed through the bridge connector 69, tail light terminals 64 and 66 and line 76 to the branch lines 77.

When operation of the headlights 74 is desired the bridge connector 69 is manually moved to connect the terminals 66, 66a and 68. In this moved position of the bridge connector 69 the headlight circuit from the branch line 83 is closed through terminal 68, the connector 69, headlight terminal 66a and dimmer switch 73 to the headlights 74. The circuit for the tail lights 78 from the branch line 83 is completed through the tail light terminal 68, the bridge connector 69, tail light terminal 66 and line 76 to the branch lines 77.

On opening of the ignition switch unit 12 to its off position, to provide for the flow of a charging current through the resistor 52, the time delay circuit 16 operates in all respects as previously described in connection with FIG. 1 to provide for a predetermined delayed opening of the holding circuit relative to the time of opening of the ignition switch unit 12.

In order to again operate the light circuit 61 the bridge connector 69 of the switch unit 62 is manually moved to temporarily connect together the starting terminals 63 and 63a after which the connector 69 is moved to a selected light operating position. In this respect it is to be noted that when the engine ignition system is on and the bridge connector 69 is moved from either terminals 64 and 64a, or 66 and 66a, and across the starting terminals 63 and 63a to its off position, shown in FIG. 2, the holding circuit 60 will be energized. The light circuit 61 is thus conditioned for operation on later manual movement of the bridge connector 69 into selective engagement with the light terminals of the switch unit 62. Similarly to the system of FIG. 1, when the ignition switch unit 12 is in its off position and the switch unit 62 is operated to turn on the light circuit 19, the time delay circuit 16 will simultaneously be set into operation. As a result the light circuit 19 will remain in operation only for the predetermined time period as set by the time delay circuit 16. Thus to provide for a continuous operation of the light circuit 61, when the engine ignition system is turned off, it is necessary that the switch arm 13 of the ignition switch unit 12 be moved to close the vehicle accessory system.

Although the control system of this invention has been described with respect to preferred embodiments thereof it is to be understood that it is not to be so limited since changes can be made therein which are within the full intended scope of this invention as defined by the appended claims.

I claim:
1. A control system for the exterior lighting system of an automobile having an engine and an ignition system therefor comprising:
   (a) a circuit for said lighting system,
   (b) a holding circuit including a relay having a normally open relay switch connected in the circuit of said lighting system and a relay winding,
   (c) said relay switch being manually operable to a closed position to close said holding circuit and said lighting system circuit, with said relay switch being maintained in said manually closed position by said relay winding,
   (d) a time delay circuit including a time delay unit, a relay having a normally closed relay switch connected in said holding circuit and a relay winding operatively associated with said normally closed relay switch and said time delay unit, and
   (e) a manually operable ignition switch for said ignition system connected in said time delay circuit,
   (f) said time delay circuit in response to the manual opening of said ignition switch being operable to delay the opening of said normally closed relay switch for a predetermined time period whereby to automatically delay the opening of said holding circuit to release said normally open relay switch.

2. A control system for the exterior lighting system of an automobile having an engine and an ignition system therefor comprising:
   (a) a circuit for said lighting system,
   (b) a holding circuit including a relay having a first normally open relay switch connected in the circuit of said lighting swstem, a second normally open relay switch for closing said holding circuit and a relay winding for moving and holding said first and second relay switches in closed positions therefor,
   (c) a light switch in the circuit for said lighting system manually operable to open and closed positions therefor,
   (d) a time delay circuit including a time delay unit, a relay having a normally closed relay switch connected in said holding circuit and a relay winding operatively associated with said normally closed switch and said time delay unit,
   (e) a manually operable ignition switch for said ignition system connected in said time delay circuit,
   (f) said light switch on initial movement from an off position to a closed position therefor being operable to temporarily close said holding circuit to provide for the closing of said normally open first and second relay switches and on continued movement thereof being operable to close the circuit of said lighting system through said second relay switch, and
   (g) said time delay circuit, in response to an open position of said ignition switch, being operable to delay the opening of said normally closed relay switch for a predetermined time period whereby to automatically delay the opening of said holding circuit to release said first and second relay switches to open positions therefor.

3. The control system according to claim 2 wherein the circuit for the lighting system includes:
   (a) headlights, parking lights and tail lights, and
   (b) said light switch being sequentially movable from an off position to a first position to provide for the closing of said holding circuit, to a second position for operating said parking lights and tail lights, and to a third position for operating said headlights and tail lights.

4. The control system according to claim 2 wherein the time delay unit in said time delay circuit includes:
  (a) a transistor responsive to a predetermined voltage build-up in said time delay circuit, on opening of said ignition switch, to energize the relay winding for said normally closed relay switch.

References Cited

UNITED STATES PATENTS

| 3,125,702 | 3/1964 | Herridge et al. | 315—83 X |
| 3,211,951 | 10/1965 | Skinner et al. | 315—77 X |
| 3,225,250 | 12/1965 | Hershberger | 315—80 X |

OTHER REFERENCES

G.E. Transistor Manual, 1964, page 320.

JAMES W. LAWRENCE, *Primary Examiner.*
R. L. JUDD, *Assistant Examiner.*